United States Patent [19]

Acda et al.

[11] 4,059,291

[45] Nov. 22, 1977

[54] BRANCH CONNECTION

[75] Inventors: Petrus Marinus Acda, Enkhuizen; Hans Edward Guitoneau, Bovenkarspel, both of Netherlands

[73] Assignee: Polva Nederland B. V., Netherlands

[21] Appl. No.: 764,590

[22] Filed: Feb. 1, 1977

Related U.S. Application Data

[63] Continuation of Ser. No. 610,568, Sept. 5, 1975, abandoned.

[30] Foreign Application Priority Data

Sept. 13, 1974 Netherlands .......................... 7412153

[51] Int. Cl.$^2$ ............................................. F16L 5/00
[52] U.S. Cl. .................................... 285/197; 285/180; 285/21
[58] Field of Search ............... 285/197, 198, 199, 353, 285/354, 355, 333, 334, 21, 421, 156, 114, 309–312; 137/318, 317, 319, 320, 15

[56] References Cited

U.S. PATENT DOCUMENTS

| 3,489,441 | 1/1970 | Malcolm | 285/197 |
| 3,756,628 | 9/1973 | St. Clair | 285/355 X |
| 3,799,189 | 3/1974 | Christianson | 285/197 X |
| 3,844,590 | 10/1974 | Burton | 285/197 |
| 3,918,748 | 11/1975 | Acda | 285/21 |

FOREIGN PATENT DOCUMENTS 7,217,498  6/1974  United Kingdom ................. 285/197

Primary Examiner—G. V. Larkin
Attorney, Agent, or Firm—Frank R. Trifari; David R. Treacy

[57] ABSTRACT

Branch connection for a pipe, which connection comprises a saddle-shaped part provided with an internally screw-threaded tubular member integral with said part, and a tee piece provided with a screw thread which engages with the first-mentioned screw thread, a sealing member being disposed between the end of the tee piece nearest to the pipe and the external screw thread on said tee piece.

6 Claims, 1 Drawing Figure

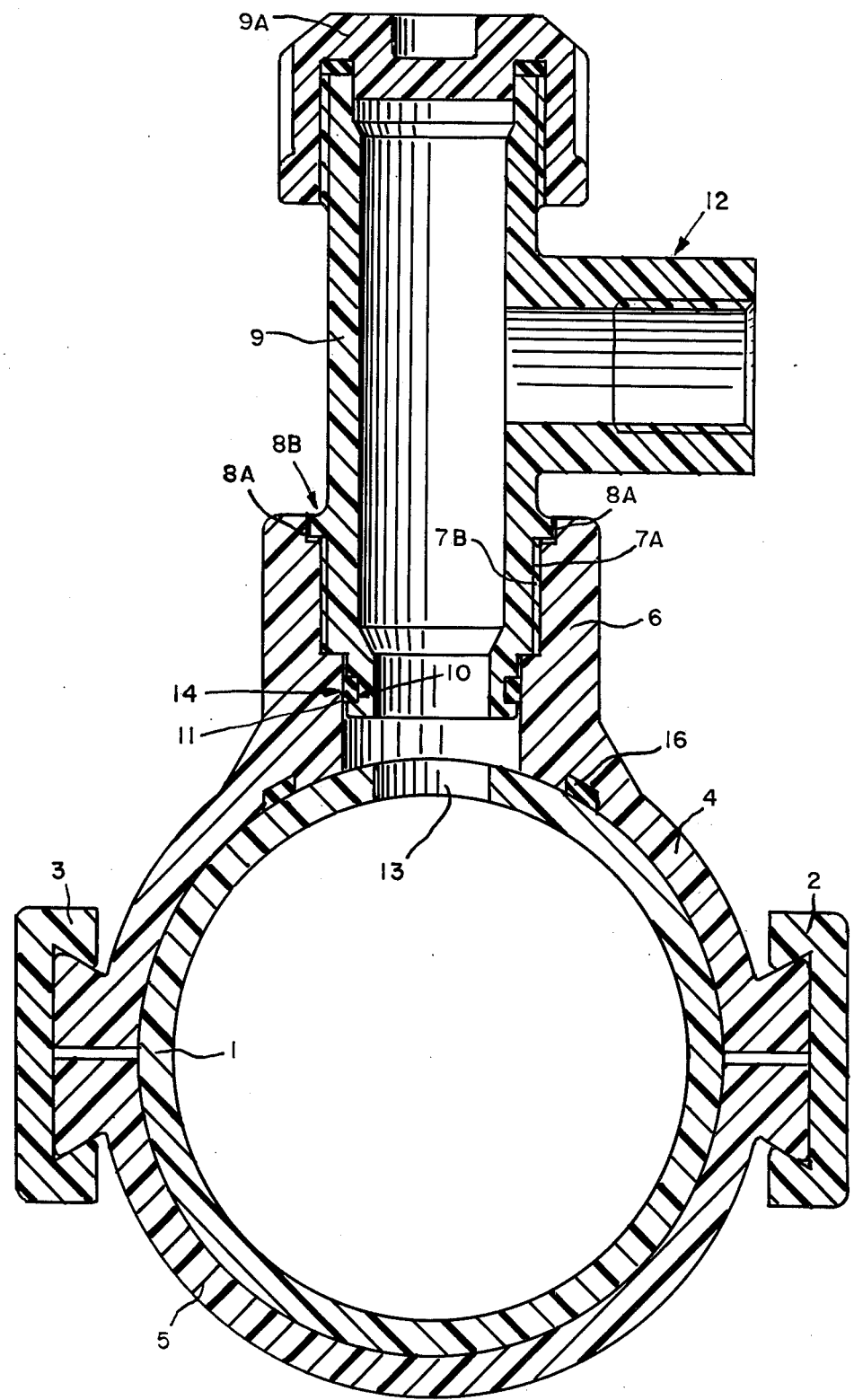

BRANCH CONNECTION

This is a continuation of application Ser. No. 610,568 filed Sept. 5, 1975. Application Ser. No. 610,568 is abandoned.

The invention relates to a branch connection for a pipe, which comprises a saddle-shaped part provided with an internally screw-threaded tubular member integral with said part and a tee piece having an external screw thread which engages with the aforementioned screw thread and has the same pitch, and a sealing member which in the mounted condition is positioned between the inner surface of the tubular member and the outer surface of the tee.

A branch connection of the above-mentioned type is known. In the known branch connection, in the mounted condition the screw threads on the inner wall of the tubular member and on the outer wall of the tee piece terminate at some distance from that end of the integral tubular piece which is remote from the saddle-shaped part. A sealing ring is located between the said end of the member and the termination of the screw thread. In this construction the sealing ring may be accommodated in a recess formed in the wall of the tee piece.

The known branch connection is suitable for use in gas distribution networks but is unsuitable for water distribution networks, in particular if the water flowing through the pipes has a high hardness. Under these conditions calcium carbonate can deposit between the screw threads so that the position of the tee piece relative to the pipe will become more or less fixed, because the relative mobility of these parts is entirely or largely lost. This may be a drawback when soil movements occur in the ground, because stresses in the pipes may give rise to leakages. The said fixation may also be a disadvantage when work is to be done in the ground on or near the relevant distribution network. In doing such work the exertion of forces on the pipes must be avoided.

It is an object of the present invention to provide a branch connection in which difficulties of this nature cannot occur. According to the invention this is achieved by a branch connection which is characterized in that the seal is located between those wall portions of the tubular member and the tee piece which lie between the screw threads present thereon and those ends of the member and the tee piece which are nearer the pipe.

In the branch connection according to the invention the fluid which flows through the pipes, for example water, cannot come into contact with the screw-threads. A layer of calcium carbonate deposited on that part of the sealing member which contacts the water cannot block motion of the tee piece relative to the tubular member. The seal may be disposed in a recess in the wall of the tee piece or in the wall of the tubular member and engages a sealing surface formed on the opposite wall. However, in the branch connection according to the invention the sealing member preferably is disposed in a recess formed in the wall of the tee piece. This prevents the sealing member from being pushed out from between the walls of the tubular member and the tee piece when the latter is inserted into the body or when, in the mounted state, the position of the branch pipe relative to the main pipe is changed.

The tee piece may comprise a tubular tapping member and a branch receiving socket, the tapping member in the mounted state extending substantially at right angles to the pipe. The tubular tapping member is provided at one end with a recess which accommodates a sealing member, for example a sealing ring, and with an external screw thread, and at the other end with a closable opening, and carries a branch receiving socket which is integral with the tubular tapping member and at the end remote from it can be connected to a branch pipe (service pipe). Through the closable end of tubular tapping member, which member in the mounted state is substantially at right angles to the pipe, an opening can be cut in this pipe by means of a tapping tool. The length of the sealing surface which is present on the inner wall of the tubular member integral with the saddle-shaped part and which engages the sealing member, when measured in a direction at right angles to the pipe, is such that from the final position reached when the tubular tapping member is screwed in the tubular member, the tubular tapping member can be unscrewed from this body at least through 360° without the sealing member leaving the sealing surface.

In an embodiment which has proved of advantage in practice the outer wall of the tubular tapping member, which member in the mounted state is arranged substantially at right angles to the pipe, is provided, at some distance from that end which during the mounting operation faces the saddle-shaped part, with a collar which when the run is inserted into the tubular member integral with the saddle-shaped part falls within a recess formed in the rim of that end of this member which is remote from the saddle-shaped part. The depth of the recess in the rim of the tubular member is at least equal to the length of the sealing surface which engages the sealing member, so that when the tubular tapping member is rotated from the final position through an angle of 360° the collar just is not disengaged from the recess. This construction provides the advantage that sand or other soil constituents cannot readily find their way between the inner wall of the tubular member integral with the saddle-shaped part and the outer wall of the tubular tapping member mounted therein by means of the screw threads. The branch receiving socket of the tee piece can be connected to a branch pipe in any manner known in the art.

The sealing member may be an O-ring made of an elastically compressible material, for example natural rubber or a rubber-like synthetic material. The saddle-shaped parts amd the other parts of the branch connection are made of materials suitable for their particular functions. Suitable materials are, for example, cast iron, polypropylene, polyvinylchloride, polyoxymethylene.

An advantage of the construction according to the invention is that the screwed connection between the tee piece and the tubular member is not loaded by the internal pressure of the fluid in the pipe so that at the location of the screw threads, at least for the tubular member integral with the saddle-shaped part, a smaller material thickness can be used as compared to a construction in which such screwed connection should be subjected to this pressure.

Another advantage of the construction according to the invention is that in using the tee piece the position of a branch receiving socket relative to the pipe can be chosen at will so that under any circumstances the most advantageous position can be selected. For example, when a branch pipe made of a comparatively rigid material is used the branch recceiving socket may have to be arranged parallel to the main pipe and to be connected to the branch pipe via a bend. A change in the position of the branch pipe relative to the main pipe then will not give rise to stresses in the connecting means, provided the latter permit rotation.

The invention will now be described, by way of example, with reference to the accompanying diagrammatic drawing, the single FIGURE of which shows an embodiment of a branch connection according to the invention partly in cross-section.

The figure shows a main pipe 1 made of a synthetic resin material on which saddle-shaped parts 4 and 5 are secured by means of closure members or clamps 2 and 3. A tubular member 6 is integral with the saddle-shaped part 4. It is provided with a screw thread 7A in its inner wall, and its end remote from the pipe 1 is formed with a recess 8A.

The tee piece comprises a tubular tapping member 9 which at the end remote from the pipe 1 is closed by a closure cap 9A screwed on to it. At its end facing main pipe 1 tubular tapping member 9 is provided with a screw thread 7B which engages with the screw thread 7A. The said end is formed with a recess 10 in which the sealing member in the form of an O-ring 11 is accomodated. Tubular tapping member 9 has a collar 8B which when the tapping member 9 is screwed into the tubular member 6 is entirely or partly received in the recess 8A. The provision of the collar 8B prevents soil particles from finding their way between the screw threads 7A and 7B when the branch connection is buried. The depth of the recess 8A is at least equal to the length of the path which the sealing member 11 travels along a circular cylindrical sealing surface 14 when the tubular tapping member 9 is rotated through 360° from the final position so that the collar (B just does not leave the recess 8A. Tubular tapping member 9 has a branch receiving socket 12 for connection to a branch pipe. The branch connection can be secured to main pipe 1 in the following manner:

The saddle-shaped parts 4 and 5 are secured to the pipe 1 by means of the clamps 2 and 3, and part 4 is sealed to the pipe by any of the means well known in the art, such as a seal 16. Then the tubular tapping member 9 is secured in the tubular member 6. After the branch pipe has been secured to socket 12 a tapping tool (a milling cutter or the like, not shown), which may be a permanent fixture, is inserted through the opening adapted to be closed by the cap 9A to cut an opening 13 in main pipe 1, after which, if desired after removal of the tool, the tubular tapping member 9 is closed by screwing on the cap 9A.

What is claimed is:

1. Branch connection for a pipe, which comprises a saddle-shaped part having an internally screw-threaded tubular member integral with said part a tee piece having an external screw thread which engages with the aforementioned screw thread and has the same pitch, and a sealing member which in the mounted condition is positioned between the inner surface of the tubular member and the outer surface of the tee piece, characterized in that the sealing member is located between concentric circular cylindrical wall portions of the tubular member and the tee piece which lie between the screw threads present thereon and those ends of the member and of the tee piece which are nearer to the pipe.

2. Branch connection for a pipe as claimed in claim 1, characterized in that the sealing member is positioned in a recess formed in the wall of the tee piece and engages a sealing surface portion of said inner surface formed on the opposite wall of the tubular member.

3. Branch connection for a pipe as claimed in claim 2, characterized in that the tee piece comprises a tubular tapping member having said recess at one end and a closable opening at an opposite end, and a branch receiving socket which is integral with this tubular tapping member and at an end remote from the tubular tapping member comprises means for connection to a branch pipe.

4. Branch connection as claimed in claim 3 characterized in that the sealing surface, which is formed on the inner wall of the tubular member integral with the saddle-shaped part and engages with the sealing member, has a length measured in a direction at right angles to the pipe such that, from a final position reached when the tubular tapping member is screwed in said tubular member, the tubular tapping member can be rotated without the sealing member leaving the sealing surface.

5. Branch connection as claimed in claim 4, characterized in that the tubular tapping member has an outer collar between said branch receiving socket and said external screw thread, and a recess is formed in a rim of that end of the tubular member part of the saddle-shaped part which is remote from the saddle-shaped part, said collar being within said recess in said final position.

6. Branch connection as claimed in claim 5, characterized in that said recess formed in said rim has a depth at least equal to said length of the sealing surface which engages with the sealing member.

* * * * *